(12) United States Patent
Assmann et al.

(10) Patent No.: US 9,050,912 B2
(45) Date of Patent: Jun. 9, 2015

(54) FITTING FOR A VEHICLE SEAT

(75) Inventors: Uwe Assmann, Remscheid (DE);
Gunther Hille, Remscheid (DE)

(73) Assignee: KEIPER GMBH & CO. KG,
Kaiserslautern (DE)

( * ) Notice: Subject to any disclaimer, the term of this patent is extended or adjusted under 35 U.S.C. 154(b) by 436 days.

(21) Appl. No.: 13/395,395

(22) PCT Filed: Aug. 20, 2010

(86) PCT No.: PCT/EP2010/005104
§ 371 (c)(1),
(2), (4) Date: May 29, 2012

(87) PCT Pub. No.: WO2011/029521
PCT Pub. Date: Mar. 17, 2011

(65) Prior Publication Data
US 2012/0223562 A1    Sep. 6, 2012

(30) Foreign Application Priority Data

Sep. 10, 2009   (DE) .......................... 10 2009 041 491

(51) Int. Cl.
*B60N 2/235*    (2006.01)
*B60N 2/225*    (2006.01)

(52) U.S. Cl.
CPC ............ *B60N 2/2252* (2013.01); *B60N 2/2356* (2013.01)

(58) Field of Classification Search
USPC .............................................. 297/362, 367 P
See application file for complete search history.

(56) References Cited

U.S. PATENT DOCUMENTS

| | | | | |
|---|---|---|---|---|
| 4,708,392 A * | 11/1987 | Werner et al. | ................. | 297/362 |
| 6,390,556 B1 * | 5/2002 | Moradell | ....................... | 297/362 |
| 6,830,298 B2 * | 12/2004 | Koczewski | .................... | 297/362 |
| 7,278,689 B2 * | 10/2007 | Guillouet | ..................... | 297/362 |
| 7,293,837 B2 * | 11/2007 | Assmann et al. | ............. | 297/374 |
| 7,475,945 B2 * | 1/2009 | Reubeuze et al. | ........ | 297/367 R |
| 7,798,574 B2 * | 9/2010 | Ishihara et al. | .............. | 297/362 |
| 8,262,165 B2 * | 9/2012 | Mitsuhashi | ................... | 297/362 |

(Continued)

FOREIGN PATENT DOCUMENTS

| | | |
|---|---|---|
| DE | 44 36 101 A1 | 6/1995 |
| DE | 195 48 809 C1 | 5/1997 |

(Continued)

OTHER PUBLICATIONS

Notification of Transmittal of Translation of the International Preliminary Report on Patentability, which includes the Written Opinion of the International Searching Authority in PCT/EP2010/005104 dated Mar. 22, 2012.

(Continued)

*Primary Examiner* — David R Dunn
*Assistant Examiner* — Timothy J Brindley
(74) *Attorney, Agent, or Firm* — Foley & Lardner LLP (57) ABSTRACT

With a fitting for a vehicle seat, in particular for a motor vehicle seat, having a first fitting part and a second fitting part which are rotatable relative to each other and which are axially held together by an enclosing ring, wherein at least one fitting part has a shoulder on the end face facing away from the other fitting part, said shoulder having an axially protruding contour, for the form-fitting cooperation with the structure of a seat part or a backrest of the vehicle seat, a star shoulder is provided as shoulder, said star shoulder having a multi-arm, substantially symmetric star shape.

11 Claims, 6 Drawing Sheets

(56) References Cited

U.S. PATENT DOCUMENTS

| | | | |
|---|---|---|---|
| 2005/0110322 A1* | 5/2005 | Cha | 297/362 |
| 2006/0279121 A1* | 12/2006 | Matsumoto et al. | 297/362 |
| 2007/0035168 A1* | 2/2007 | Assmann | 297/353 |
| 2008/0061616 A1* | 3/2008 | Wahls et al. | 297/362 |
| 2008/0303331 A1* | 12/2008 | Heo | 297/362 |
| 2009/0200850 A1* | 8/2009 | Heo | 297/362 |
| 2009/0224588 A1* | 9/2009 | Matsumoto et al. | 297/362 |
| 2010/0013288 A1* | 1/2010 | Mitsuhashi | 297/362 |
| 2010/0201174 A1* | 8/2010 | Ito | 297/362 |
| 2011/0101755 A1* | 5/2011 | Assmann | 297/366 |
| 2011/0115271 A1* | 5/2011 | Yamada et al. | 297/367 P |
| 2012/0001471 A1* | 1/2012 | Wei | 297/362 |
| 2012/0169104 A1* | 7/2012 | Stilleke et al. | 297/362 |
| 2012/0205956 A1* | 8/2012 | Nock et al. | 297/362 |
| 2014/0001806 A1* | 1/2014 | Golarz | 297/362 |
| 2014/0077561 A1* | 3/2014 | Sasaki | 297/367 P |

FOREIGN PATENT DOCUMENTS

| | | |
|---|---|---|
| DE | 198 13 517 B4 | 10/1998 |
| DE | 1020050 12 790 A1 | 9/2006 |
| DE | 1020050 46 807 B3 | 11/2006 |
| DE | 1020060 15 560 B3 | 8/2007 |
| DE | 1020080 33 665 A1 | 6/2009 |
| DE | 1020090 41 491 A1 | 3/2011 |
| JP | 2009-061007 A | 3/2009 |
| WO | WO-01/83259 A1 | 11/2001 |
| WO | WO-2009/060641 A1 | 5/2009 |

OTHER PUBLICATIONS

International Search Report dated Oct. 25, 2011 as received in corresponding PCT Application No. PCT/EP2010/005104, 8 pages.

* cited by examiner

FITTING FOR A VEHICLE SEAT

CROSS REFERENCE TO RELATED APPLICATIONS

The present application is a National Stage of International Application No. PCT/EP2010/005104 filed on Aug. 20, 2010, which claims the benefit of German Patent Application No. 10 2009 041 491.6 filed on Sep. 10, 2009, the entire disclosures of which are incorporated herein by reference.

The invention relates to a fitting for a vehicle seat having the features of the preamble of claim 1.

A fitting of this type is known from DE 198 13 517 B4. The fitting part has a plurality of cone-shaped shoulders side by side which partly serve for pre-positioning and partly for fixing to the structure. Manufacturing and fitting are expensive, and the spacings of the fixing points to each other are relatively small.

The object of the invention is to improve a fitting of the type mentioned in the introduction. This object is achieved according to the invention by a fitting having the features of claim 1. Advantageous configurations are the subject-matter of the subordinate claims.

By providing a star shoulder as a shoulder which is an axially protruding contour for cooperating with a positive fit with the structure of a seat part or of a backrest, said star shoulder having a multi-arm, substantially symmetric star shape, a defined interface between the fitting and the structure of the seat part or of the backrest is created. The interface is universally applicable in the different joining methods, for example for laser-welding with long, if appropriate interrupted weld seams, and for MAG welding with single, short weld seams. For forming the star shoulder—compared to one single ring shoulder—only part of the material of the fitting part must be pressed out. Nevertheless, due to the shape of the star shoulder, the spacings which arise between the fixing points are relatively large. Compared to a plurality of single, cone-shaped shoulders, welding expenses on this end face of the fitting are reduced with one single star shoulder, since the welding process does not have to be interrupted several times.

If required, a certain orientation of the fitting part can be forced by means of the star shoulder. For this purpose, the exact symmetry of the star shape (rotational symmetry, mirror symmetry) can be broken also by a deviation, which, in its dimensions, is small with respect to the star shape, and which serves as (additional) positioning aid or as an anti-rotation element. The star shoulder is particularly advantageous for detent fittings having a fourfold symmetry as well.

The fact that the enclosing ring has a centering section which extends axially with respect to the outer ring section and which engages over the first fitting part radially outward and partly covers its outer surface, creates a centering aid, which makes an exact positioning of the enclosing ring on the first fitting part possible, so that subsequently a faultless fixing of the enclosing ring at the first fitting part can take place. This avoids the problem which exists with the known fitting, namely that the enclosing ring is positioned faultily and subsequently welded in this faulty position, or that additional auxiliary devices, for example precisely worked stop jaws become necessary, in order to minimize rejects. In particular a closed, uninterrupted centering section protects the enclosing ring from being damaged between being manufactured and being built in. The enclosing ring which is fixed to the first fitting part besides increases solidity of the fitting and consequently its safety. It is, however, also possible that the enclosing ring is bent over in a manner known per se, i.e. that it covers the first fitting part on its outer surface—in both, the cylindrical section and on the end face which is faced away from the second fitting part, or that the enclosing ring is pressed onto the cylindrical region of the outer surface of the first fitting part and is welded to the latter.

The solution according to the invention is at first independent from the inner structure of the fitting, i.e. whether it is designed as a gear fitting or as a detent fitting. A modular system, in which the same technique of the enclosing ring or the same defined interface to the structure is available, is thus possible, that is to say, the same installation space is required in general, and the same dimensions in particular, but the inner structure with respect to the special application can be substantiated, for example according to customers' requests.

The technique of the enclosing ring which has been developed further according to the invention leads to savings in weight and costs if, in the case of the gear fitting, the toothed wheel and, in the case of the detent fitting, the guide segments are configured at the radially outer edge of the assigned second fitting part. The enclosing ring can clasp over and cover the toothed wheel or over the guide segments, thus protecting them.

The use of an eccentric epicyclic gear system enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric epicyclic gear system can be driven manually or by motor. The eccentric can be a fixed eccentric configured in one piece or an eccentric configured of several parts, consisting of wedge segments which are pre-biased towards one another and which keeps the fitting free of backlash.

The invention is explained in more detail hereinafter with reference to two exemplary embodiments with modifications shown in the drawing, in which.

Figure 3:
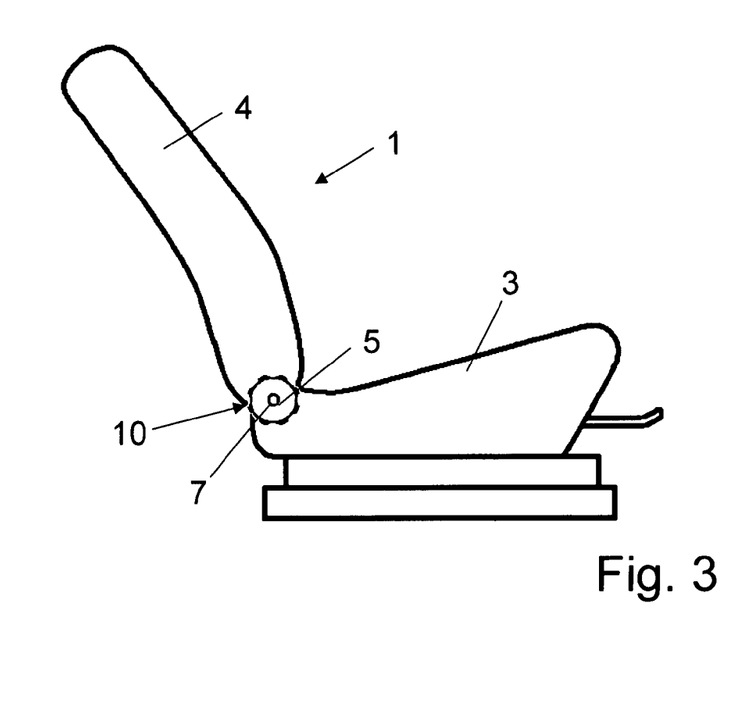
FIG. 3 shows a schematic view of a vehicle seat.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a hand wheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

Figure 1:
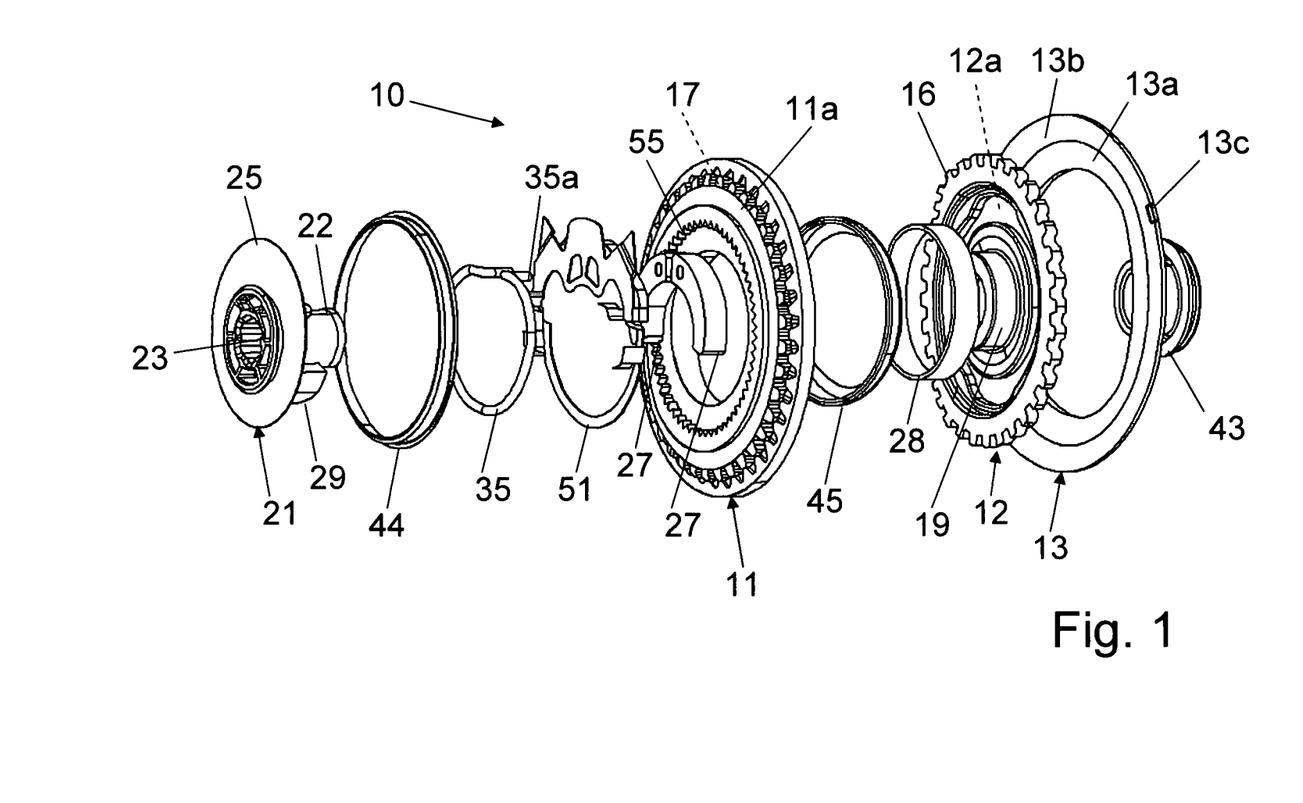
FIG. 1 shows an exploded view of the first exemplary embodiment.
Figure 2:
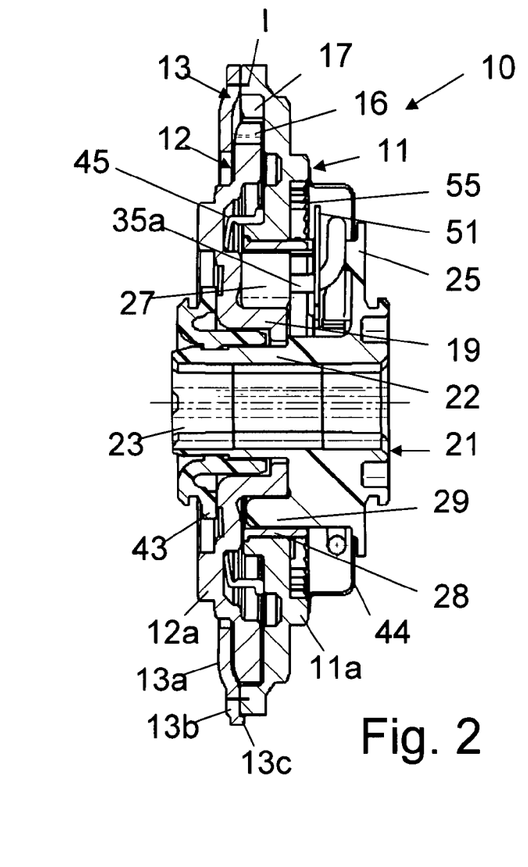
FIG. 2 shows an axial cut through the first exemplary embodiment.

The fitting 10 has a first fitting part 11 and a second fitting part 12 which are rotatable relative to one another. Each of the two fitting parts 11 and 12 can be approximately inscribed in a circular disk shape. The two fitting parts 11 and 12 are preferably composed of metal, in particular steel which, at least in some areas, can be hardened. In order to absorb the axially acting forces, i.e. in order to hold the fitting parts 11 and 12 axially together, an enclosing ring 13 is provided. The enclosing ring 13 is preferably composed of metal, in particular of steel, which is preferably unhardened. The enclosing ring 13 has a substantially flat ring shape, in the present case with a (radially) inner ring section 13a, a (radially) outer ring section 13b, at least one centering section 13c, and, if appropriate, with connecting sections between them.

The enclosing ring 13 is fixedly connected with one of the two fitting parts 11 and 12, in the present case in the outer ring section 13b with the first fitting part 11. By means of the inner ring section 13a, which is arranged in a plane which is perpendicular to the axial direction, the enclosing ring 13 engages over the second fitting part 12 radially outwards (i.e. in its radially outer end section), if appropriate by the interposition of a sliding ring, without impeding the relative rotation of the two fitting parts 11 and 12. Moreover, the inner surfaces of the two fitting parts 11 and 12 which face one another are protected from the intrusion of foreign material and from impurities and damage.

The outer ring section 13b can be arranged in a plane which is slightly displaced axially with respect to the inner ring section 13a (for example by the material thickness of the sliding ring), or be bent in profile, at a certain angle to the inner ring section 13a. It is also possible, however, that the outer ring section 13b and the inner ring section 13a flatly (i.e. without step and/or bend and thus unremarkably) merge into one another, i.e. that they are defined merely by their respective neighborhood to the different fitting parts 11 and 12. By means of the outer ring section 13b, the enclosing ring 13 bears—in a preferably planar manner—against the first fitting part 11 at its inner face, more precisely at its inner end face in a radially outer end section, and is fixed to the first fitting part there.

The enclosing ring 13 and the fitting part 11 or 12 which is tightly connected with it consequently enclose the other one of the two fitting parts 11 and 12 which is movable relative to them. From a structural point of view, the two fitting parts 11 and 12 together (with the enclosing ring 13) consequently form a disk-shaped unit.

With respect to the outer ring section 13b, the centering section 13c extends in the axial direction, preferably by a maximum of one material thickness of the enclosing ring 13. The centering section 13c clasps the first fitting part 11 radially outward, i.e. the centering section 13c partly covers the first fitting part 11 on its outer surface, more precisely in the cylindrical region of its outer surface. The centering section 13c can be embossed (i.e. the material at the edge of the outer ring section 13b is shifted forward in the axial direction, for example by half the material thickness of the enclosing ring 13). The centering section 13c can be configured also by bending of the edge (i.e. the material at the edge of the outer ring section 13a is bent through 90°). In the circumferential direction, the centering section 13c can be completely uninterrupted or be interrupted, for example only in two wider arc pieces or three smaller arc pieces. In all cases, the centering section 13c serves for exactly positioning the enclosing ring 13 before fixing it to the first fitting part 11, namely concentrically to the first fitting part 11. Additionally, the centering section 13c increases solidity of the completely assembled fitting 10. In the variant which is completely uninterrupted in the circumferential direction, the centering section 13c, before positioning at the first fitting part 11 takes place, protects the ring shape of the enclosing ring 13 from deformations by axially acting forces, for example during transport after punching.

Figure 12:
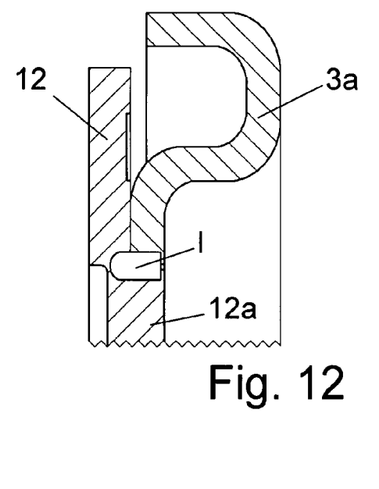
FIG. 12 shows a cut through an I-seam at a butt joint.

The enclosing ring 13 can be fixed to the first fitting part 11 by means of laser welding or by means of another fixing technique known per se. In the case of laser welding, it is, for example, possible to generate an I-seam I at a butt joint (analogue to FIG. 12), for example between the outer ring section 13b and the first fitting part 11, or an I-seam I at a lap joint (analogue to FIG. 13) ("penetration"), and more precisely from an axial direction or from a radial direction. The I-seam I can be configured over the circumference with a plurality of single, interrupted weld-seam sections or with one single, uninterrupted weld seam.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 are preferred, if the radial spacings of the fixing points between the fitting 10 and a relatively thin backrest metal sheet as backrest side support shall be as large as possible. The assignments of the fitting parts 11 and 12 can, however, also be exchanged, i.e. the first fitting part 11 would then be fixed with respect to the seat part and the second fitting part 12 would be fixed with respect to the backrest. The fitting 10 is located in the force flow between backrest 4 and seat part 3.

Figure 13:
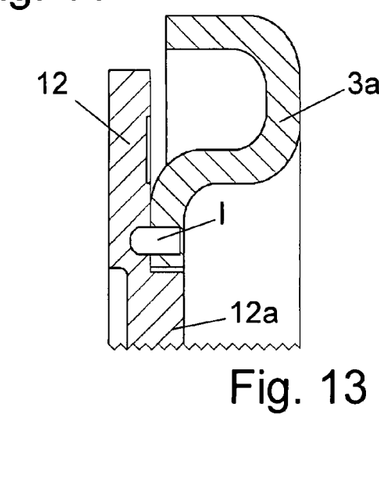
FIG. 13 shows a cut through an I-seam at a lap joint.

For a defined interface of the fitting 10 to the structures of seat part 3 and backrest 4, axially protruding contours are provided at the two fitting parts 11 and 12, which cooperate with a positive fit with corresponding openings in structural parts of seat part 3 and backrest 4, for example in customer-specific adapters (in the present case in an adapter 3a which is fixed with respect to the seat part) or directly in the seatframe side part or in the backrest side support 4a. The so prepositioned fitting 10 can then be fixed to the corresponding structural part, for example by laser welding or by MAG welding. In the case of laser welding, an I-seam I can be provided as an uninterrupted (or in some spots interrupted) weld seam between the fitting 10 and the structural parts 3a or 4a. The I-seam I can be provided as a butt joint (FIG. 12) between the axially protruding contour and the edge of the opening which accomodates the contour, or as a lap joint (FIG. 13). In the case of MAG welding, the weld seam is preferably provided only at single, distinguished points along the butt joint. If appropriate, the butt joint partly is expanded with a free space, by the edge of the opening being provided with a step or with a bevel, so that the weld seam can better enter, and better joins also in the radial direction.

Figure 9:
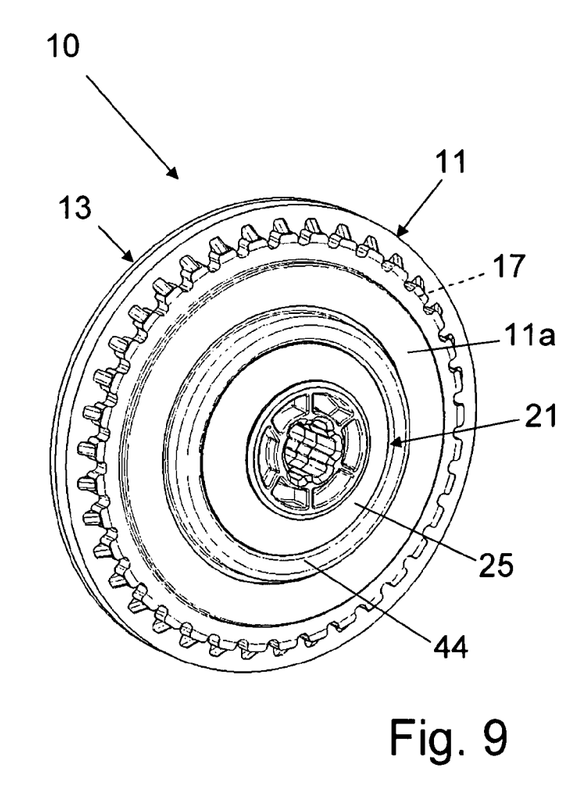
FIG. 9 shows a perspective view of the end face facing the backrest in the first exemplary embodiment.
Figure 11:
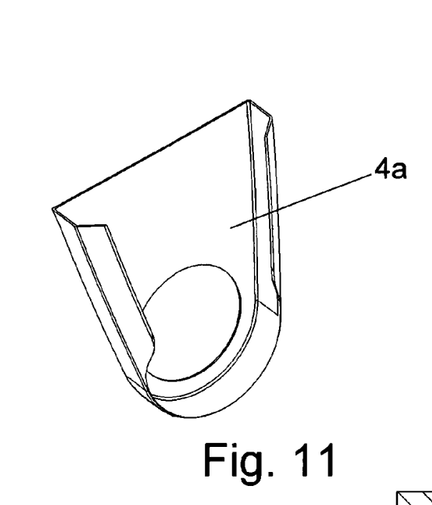
FIG. 11 shows a perspective partial view of a backrest side support.

In the present case, a circular ring shoulder 11a is configured on the first fitting part 11—on its end face facing away from the second fitting part 12—for example by pressing out material—when embossing the first fitting part 11. The ring shoulder 11a engages through a circular opening in the backrest side support 4a with a positive fit, so that the backrest side support 4a gets to bear against the first fitting part 11 in the part of the end face of the first fitting part 11 which is arranged radially outside of the ring shoulder 11a. Along the outer edge of the ring shoulder 11a, a weld seam is then applied. In the case of laser welding, the weld seam can reciprocate the circular course of the outer edge of the ring shoulder 11a.

Figure 8:
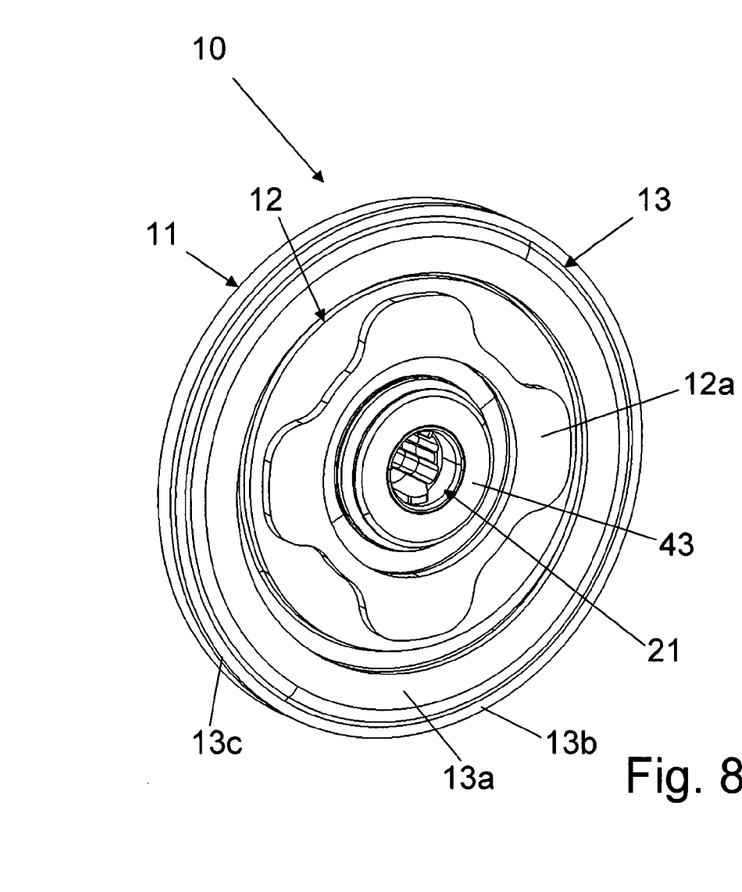
FIG. 8 shows a perspective view of the end face facing the seat part in the first exemplary embodiment.
Figure 10:
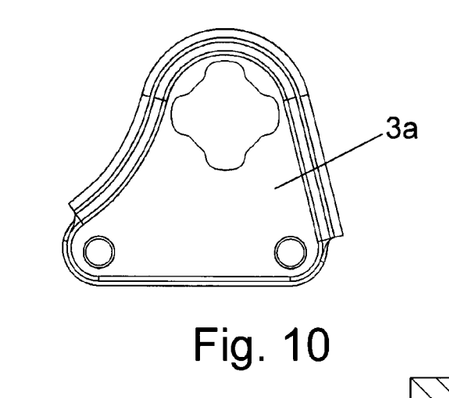
FIG. 10 shows a view of an adapter which is fixed with respect to the seat part.

In the present case, a star shoulder 12a is configured on the second fitting part 12—on its end face facing away from the first fitting part 11. The star shoulder 12a has a multi-arm, substantially symmetric star shape (in the present case a four-arm cross). The substantially symmetric star shape can be exactly symmetric or show a deviation, the dimension of which is small compared to the (radial) dimensions of the star shoulder 12a, and by means of which (in addition to the star shape), a positioning aid or an anti-rotation element is created, which forces the form-fit with the structural parts 3a and 4a in exactly one possible orientation.

With the present star shoulder 12a, each arm ends with a convex arc (and a straight piece), and the arms in the present case merge into one another tangentially with a concave arc (and a straight piece). Circular arcs, i.e. having a constant curvature, are preferred, however also other, in particular trigonometric arcs are conceivable. In the present case, further pressed-out material is provided in the center of the star shoulder 12a, for reasons of installation space. The star shoulder 12a engages with a positive fit through an exactly appropriate opening in the adapter 3a which is fixed with respect to the seat part (or in the seat frame), so that the adapter 3a which is fixed with respect to the seat part (or the seat frame) gets to bear against the second fitting part 12 in the section of the end face of the second fitting part 12 which is arranged radially outside the star shoulder 12a. Along the outer edge of the star shoulder 12a, a weld seam is then applied. In the case of laser welding, said weld seam can reciprocate the outer edge of the star shoulder 12a. In the case of MAG welding, a short weld seam is provided, for example, at the end of each arm.

The star shoulder 12a has the advantage that, for its configuration, only part of the material of the second fitting part 12 must be pressed out, and nevertheless relatively big spacings of the fixing points arise. Besides, in case of necessity, (due to the star shape and, if appropriate, by deviating from the exact symmetry), a certain orientation of the second fitting part 12 can be forced. In a modified embodiment, a star shoulder instead of a ring shoulder 11a is provided also on the first fitting part 11.

The external features of the fitting 10 described until now are largely independent from its inner structure, so that they are identical for both exemplary embodiments, apart from detail dimensions. The two exemplary embodiments therefore substantially differ only by the features of their inner structure.

In the first exemplary embodiment, the fitting 10 is in the form of a gear fitting in which the first fitting part 11 and the second fitting part 12 are connected to each other by means of a gear unit for displacement and fixing in position, to be more precise, by means of an eccentric epicyclic gear system, which in the present case is self-locking as described, for example, in DE 44 36 101 A1, the relevant disclosure of which is expressly incorporated herein.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16. The toothed wheel 16 and the toothed ring 17 are formed preferably by means of one single stamping process which simultaneously punches the fitting parts 11 and 12 from their initial material.

One of the two fitting parts 11 and 12 on the side facing the toothed ring 17, in the present case the second fitting part 12, has a collar 19 concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disk 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disk 25, such sealing ring being composed for example of rubber or of soft plastics material and being connected with, in particular clipped to, the covering disk 25. The sealing ring 44 can also be composed of metal and be tightly connected, for example welded, to the first fitting part 11, the covering disk 25 then being movable relative to the sealing ring 44. Within the installation space between the two fitting parts 11 and 12, a separating ring 45, composed for example of plastics material, is optionally provided as internal sealing.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51 as has been disclosed, for example in DE 195 48 809 C1, the disclosure of which is expressly incorporated herein, is still provided preferably as locking element. The retaining spring 51 in the present case cooperates with a toothing 55, which is configured as a further toothed ring at the first fitting part 11. The retaining spring 51—which is preferably supported on an axial projection of the slide bearing bush 28—each time locks the wedge segments 27 in the non-driven state (by the retaining spring 51 locking the spring 35 by bearing against the end fingers 35*a*) and is released by the driven driver 21.

Due to the present mounting of the fitting 10, the eccentric (i.e. primarily the wedge segments 27) is supported by the second fitting part 12, while, on its part, it supports the first fitting part 11. The relationships could, however, be exactly reversed, i.e. the first fitting part 11 supports the eccentric which, on its part, supports the second fitting part 12. Besides, the collar 19 can be provided on the first fitting part 11, i.e. concentrically to the toothed ring 17, and the slide bearing bush 28 can be provided on the second fitting part 12, i.e. concentrically to the toothed wheel 16. The sequence in the arrangement from the driver 21 to the securing ring 43 will be reversed correspondingly. The last-named arrangement has the advantage that the engagement of the teeth between toothed wheel 16 and toothed ring 17 on the one hand, and supporting of the eccentric on the other hand take place in the same plane. The arrangement described in the first exemplary embodiment has the advantage that a larger surface for fixing to the structure of the seat part 3 is available on the "smaller" second fitting part 12, i.e. that the star shoulder 12*a* can be accommodated in particular. Basically both arrangements are equivalent, however.

Figures 4, 5:
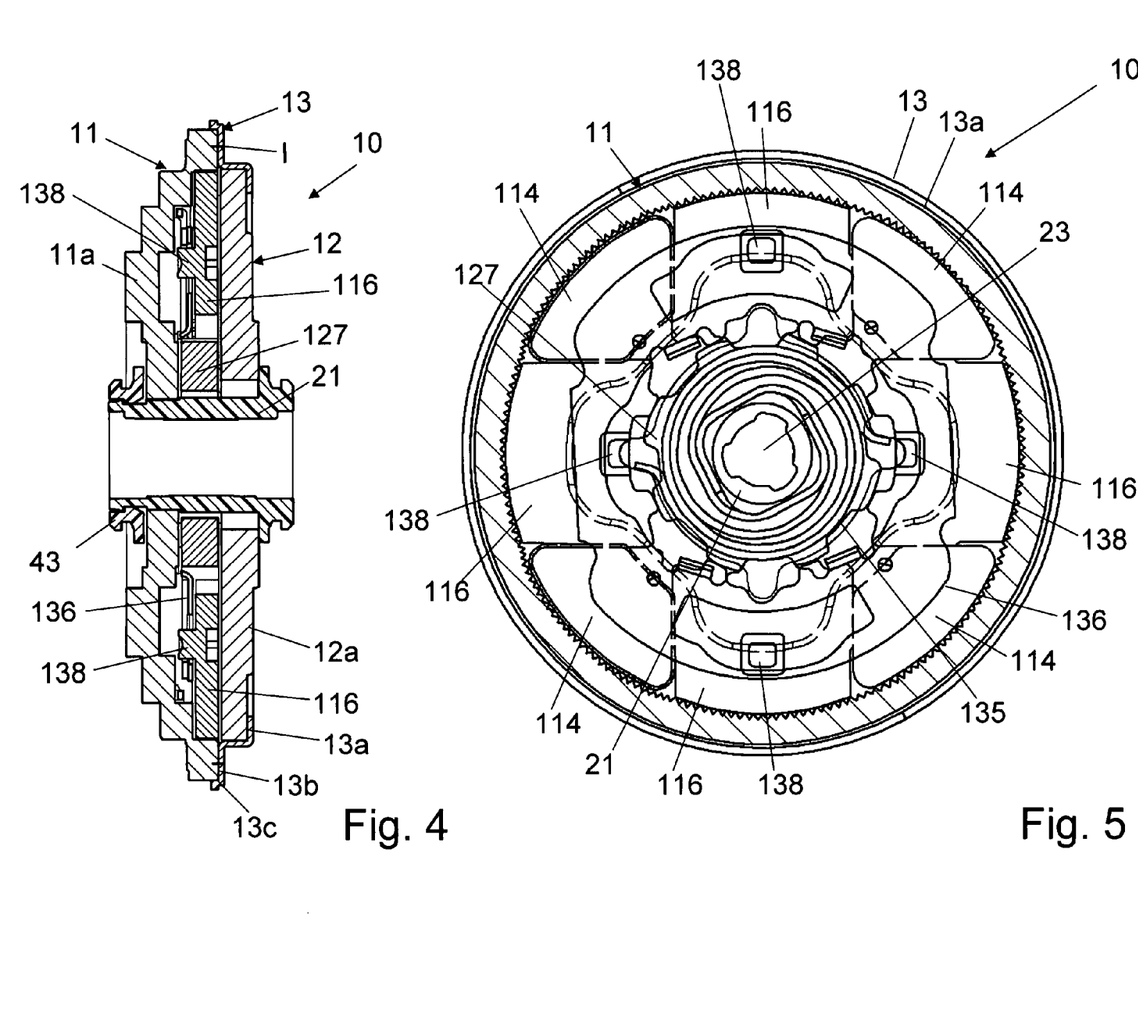
FIG. 4 shows an axial cut through the second exemplary embodiment.
FIG. 5 shows a radial cut through the second exemplary embodiment along the line V-V in FIG. 4.
Figure 6:
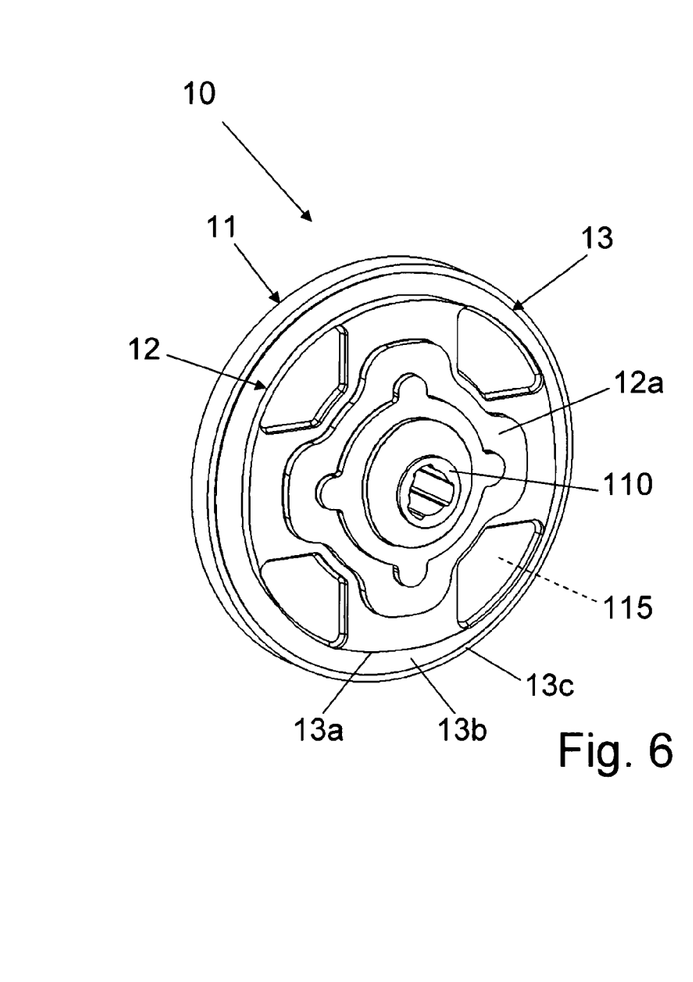
FIG. 6 shows a perspective view of the end face facing the seat part in the second exemplary embodiment.
Figure 7:
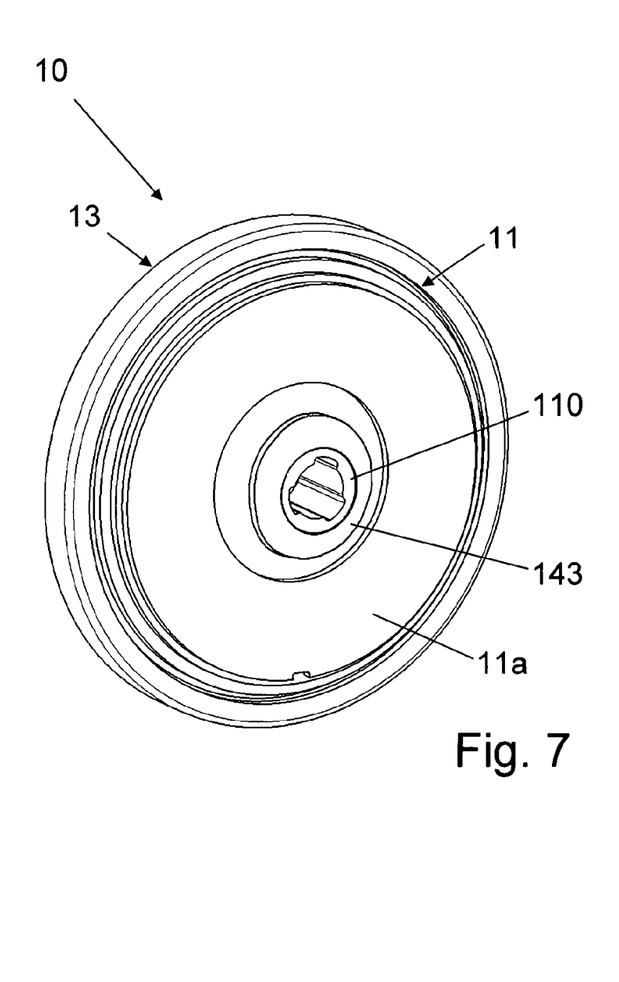
FIG. 7 shows a perspective view of the end face facing the backrest in the second exemplary embodiment.

In the second exemplary embodiment, in which identical components and components having an identical effect are designated with identical reference numerals, the fitting 10 is configured as a detent fitting, in which the first fitting part 11 and the second fitting part 12 can be locked with each other, as is described, for example, in DE 10 2006 015 560 B3, the relevant disclosure of which is expressly incorporated herein.

The second fitting part 12 has—in the present case four—guide segments 114 which, with their straight guide faces, respectively guide a locking bar 116 pairwise laterally in the radial direction. The—in the present case four—locking bars 116 are displaced with respect to each other—in the present case by 90° each—and arranged in an installation space which is defined between the two fitting parts 11 and 12. The locking bars 116 are provided with a toothing at their radially outer end, said toothing engaging (fitting) with a toothed ring 17 of the first fitting part 11 which is configured as a hollow wheel. If the toothed ring 17 and the locking bars 116 interact with each other, the fitting 10 is locked. The guide segments 114 bear against the toothed ring 17 of the first fitting part 11 with one respective bent bearing surface, the two fitting parts 11 and 12 supporting each other.

A driver 21, for example composed of plastic material, is arranged in a rotationally rigid manner—or at least mechanically connected—in the center of the fitting 10, said driver being arranged on the drive shaft 7 by means of a central bore 23 and being supported rotatably on at least one of the two fitting parts 11 and 12, in the present case on the first fitting part 11, more precisely in a central opening of the latter. An eccentric 127 is arranged on the driver 21 in a rotationally rigid manner or at least mechanically connected to it, said eccentric being arranged in an installation space which is defined between the fitting parts 11 and 12. A spring arrangement 135, for example one or two spiral springs which include each other, is arranged in a central cutout of one of the two fitting parts 11 and 12, in the present case of the second fitting part 12 and, in the present case, supported outside. The spring arrangement 135 acts upon the eccentric 127, in the present case, by being arranged on the inside of the driver 21 in a rotationally rigid manner. Such a spring arrangement 135 is described, for example in DE 10 2005 046 807 B3 the relevant disclosure of which is expressly incorporated herein. The eccentric which is under the action of the spring arrangement 135 acts upon the radially movable locking bars 116 and impinges on them, so that they are pressed radially outward, in order to engage in the toothed ring 17, thus locking the fitting 10.

A control disc 136 is arranged in the installation space axially between the locking bars 116 and the first fitting part 11 and is arranged—in the present case in a rotationally rigid manner—on the eccentric 127. The control disc 136 has—in the present case four—control curves which interact with respectively one lug 138 of each locking bar 116. The lugs 138 axially protrude from the assigned locking bars 116. The driver is secured axially by a retaining ring 43 which, during mounting of the fitting 10 is fixed, preferably clipped on, to the driver. The driver 21 and the retaining ring 43 each have one flange which respectively bears against the outer side of one of the two fitting parts 11 or 12 and which acts as a sealing. In the case of a rotation (by few degrees) of the driver 21—and of the eccentric 127 which is driven by it and the control disc 136—opposed to the force of the spring arrangement 135, the control disc 136 tears the locking bars 116 radially inward, i.e. out of the toothed ring 17, thus unlocking the fitting 10, and the two fitting parts 11 and 12 being pivotable relative to each other, about the drive shaft 7. The inclination of the backrest 4 is thus adjustable between several positions of use for seating use.

Due to the present mounting of the fitting 10, the first fitting part 11 is supported by means of its toothed ring 17 on the guide segments 114 of the second fitting part 12. The relationships could, however, be exactly reversed, i.e. the second fitting part 12 is supported by means of its guide segments 114 on the first fitting part 11, on its toothed ring 17. The arrangement described in the second exemplary embodiment has the advantage that the star shoulder 12*a* with its four arms can engage exactly between the four guide segments 114, optimizing the guide length for the four locking bars 116. Besides, in the center of the star shoulder 12*a*, the installation space required for the spring arrangement 135 can be created by means of a further shoulder. Basically, both arrangements are equivalent, however.

LIST OF REFERENCE NUMERALS

1 vehicle seat
3 seat part
3*a* adapter which is fixed with respect to the seat part
4 backrest
4*a* backrest side support
5 hand wheel
7 drive shaft
10 fitting
11 first fitting part
11*a* ring shoulder
12 second fitting part
12*a* star shoulder 13 enclosing ring
13a inner ring section
13b outer ring section
13c centering section
16 toothed wheel
17 toothed ring
19 collar
21 driver
22 hub
23 bore
25 covering disc
27 wedge segment
28 slide bearing bush
29 driver segment
35 Omega spring
35a end finger
43 retaining ring
44 sealing ring
45 separating ring
114 guide segment
116 locking bar
127 eccentric
135 spring arrangement
136 control disc
138 lug
I I-seam

The invention claimed is:

1. A fitting for a vehicle seat, comprising:
a first fitting part and a second fitting part which are rotatable relative to each other and which are axially held together by an enclosing ring,
wherein at least one fitting part has a shoulder on its end face facing away from the other fitting part, said shoulder having an axially protruding contour, for a form-fitting cooperation with a structure of a seat part or a backrest of the vehicle seat,
wherein a star shoulder is provided as the shoulder, said star shoulder having a multi-arm, substantially symmetric star shape,
wherein the star shoulder is configured in the shape of a four-arm cross,
wherein the star shoulder is configured to engage in the form-fitting cooperation through an exactly appropriate opening in the structure of the seat part or of the backrest, so that the structure of the seat part or of the backrest comes to bear against the fitting part in the section of the end face of the fitting part which is arranged radially outward the star shoulder.

2. The fitting of claim 1, wherein each arm ends with a convex arc and/or with a straight section.

3. The fitting of claim 1, wherein the arms merge into one another tangentially, with a concave arc and/or with a straight section.

4. The fitting of claim 2, wherein the arcs are circular arcs.

5. The fitting of claim 1, wherein the substantially symmetric star shape deviates from exact symmetry in a configuration in which the deviation serves as a positioning aid and/or as an anti-rotation element.

6. The fitting of claim 1, wherein a toothed ring is configured on one of the fitting parts and a toothed wheel is configured on the other one of the fitting parts, such toothed ring and toothed wheel meshing with each other, whereby the two fitting parts are in geared connection with each other, and that a rotatably supported rotating eccentric which is driven by a driver is provided for driving a relative rolling movement of toothed wheel and toothed ring.

7. The fitting of claim 6, wherein the toothed wheel is configured at the radially outer edge of the second fitting part.

8. The fitting of claim 1, wherein a toothed ring is configured on one of the two fitting parts and guide segments for supporting the toothed ring and for guiding locking bars are configured on the other one of the fitting parts, and that a spring-loaded, rotatably mounted eccentric acts upon the locking bars which are movable in the radial direction, and which interact with the toothed ring, in order to lock the fitting.

9. The fitting of claim 8, wherein the guide segments are configured on the radially outer edge of the second fitting part.

10. The fitting of claim 8, wherein the arms of the star shoulder engage between the guide segments.

11. Vehicle seat, comprising:
a fitting according to claim 1.

* * * * *